(12) United States Patent  (10) Patent No.: US 8,686,999 B2
Bronder et al.  (45) Date of Patent: Apr. 1, 2014

(54) DYNAMIC FRAGMENT COVERAGE ANTIALIASING

(75) Inventors: Matthew L. Bronder, Bellevue, WA (US); Joseph C. Bertolami, Seattle, WA (US); Matthew William Lee, Sammamish, WA (US); Michael A. Dougherty, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1040 days.

(21) Appl. No.: 12/428,188

(22) Filed: Apr. 22, 2009

(65) Prior Publication Data

US 2010/0194747 A1 Aug. 5, 2010

Related U.S. Application Data

(60) Provisional application No. 61/149,326, filed on Feb. 2, 2009.

(51) Int. Cl.
*G06T 15/40* (2011.01)

(52) U.S. Cl.
USPC ......................................................... 345/422

(58) Field of Classification Search
None
See application file for complete search history.

(56) References Cited

U.S. PATENT DOCUMENTS

| | | | | |
|---|---|---|---|---|
| 4,918,626 A | * | 4/1990 | Watkins et al. | 345/421 |
| 5,363,475 A | * | 11/1994 | Baker et al. | 345/422 |
| 5,544,294 A | * | 8/1996 | Cho et al. | 345/441 |
| 5,742,749 A | * | 4/1998 | Foran et al. | 345/426 |
| 5,760,780 A | * | 6/1998 | Larson et al. | 345/422 |
| 5,949,428 A | | 9/1999 | Toelle | |
| 5,977,977 A | * | 11/1999 | Kajiya et al. | 345/418 |
| 6,115,049 A | | 9/2000 | Winner et al. | |
| 6,128,000 A | | 10/2000 | Jouppi | |
| 6,204,859 B1 | * | 3/2001 | Jouppi et al. | 345/592 |
| 6,285,348 B1 | * | 9/2001 | Lewis | 345/614 |
| 6,377,273 B1 | | 4/2002 | Lee | |
| 6,445,392 B1 | | 9/2002 | Morein | |

(Continued)

OTHER PUBLICATIONS

Harbinson et al. ("Real-time antialiasing of Edges and Contours of Point Rendered Implicit Surfaces", IEEE Computer Society, 5th International Conf. on Computer Graphics, Imaging and Visualization, pp. 38-46, 2008).*

(Continued)

*Primary Examiner* — Daniel Hajnik
*Assistant Examiner* — William Beutel
(74) *Attorney, Agent, or Firm* — Judy Yee; Micky Minhas

(57) ABSTRACT

The following discloses antialiasing systems and methods. Information about one or more fragments or primitives in a pixel area may be dynamically stored. The stored information may include, for example, depth, color, location and coverage. The coverage and depth information may be tracked at a higher frequency across the pixel than the number of fragments or primitives. Fragments or primitives that enter into a pixel area may be compared with fragments or primitives that have been stored. The comparisons may be based on depth and coverage. Either the incoming fragment or the stored fragment may be deleted based on the comparisons. Information associated with fragments that are preserved may be sampled at any location associated with their coverage area of a pixel. Fragments or primitives that are not discarded may be preserved for a final resolve process, which may incorporate information available from neighboring pixel areas.

12 Claims, 9 Drawing Sheets

(56) References Cited

U.S. PATENT DOCUMENTS

| | | |
|---|---|---|
| 6,774,910 B2 | 8/2004 | Lewis |
| 6,963,346 B2 * | 11/2005 | Lewis ........................ 345/611 |
| 7,068,272 B1 * | 6/2006 | Voorhies et al. ............. 345/422 |
| 7,095,421 B2 * | 8/2006 | Vijayakumar et al. ........ 345/613 |
| 7,372,471 B1 | 5/2008 | Hutchins |
| 7,375,727 B1 | 5/2008 | Greene |
| 7,616,200 B1 * | 11/2009 | Heinrich et al. ............. 345/422 |
| 8,044,956 B1 * | 10/2011 | Kilgard ........................ 345/426 |
| 8,044,971 B2 * | 10/2011 | Nystad ......................... 345/614 |

OTHER PUBLICATIONS

Beaudoin, P. et al., "Compressed Multisampling for Efficient Hardware Edge Antialiasing", 2004, http://www.iro.umontreal.ca, 8 pages.

Nvidia, Technical Report, "Coverage Sampled Antialiasing", Oct. 30, 2006, http://developer.download.nvidia.com, 12 pages.

Wand, M. et al., "The Randomized z-Buffer Algorithm: Interactive Rendering of Highly Complex Scenes", Siggraph Conference Proceedings, 2001, 10 pages.

\* cited by examiner

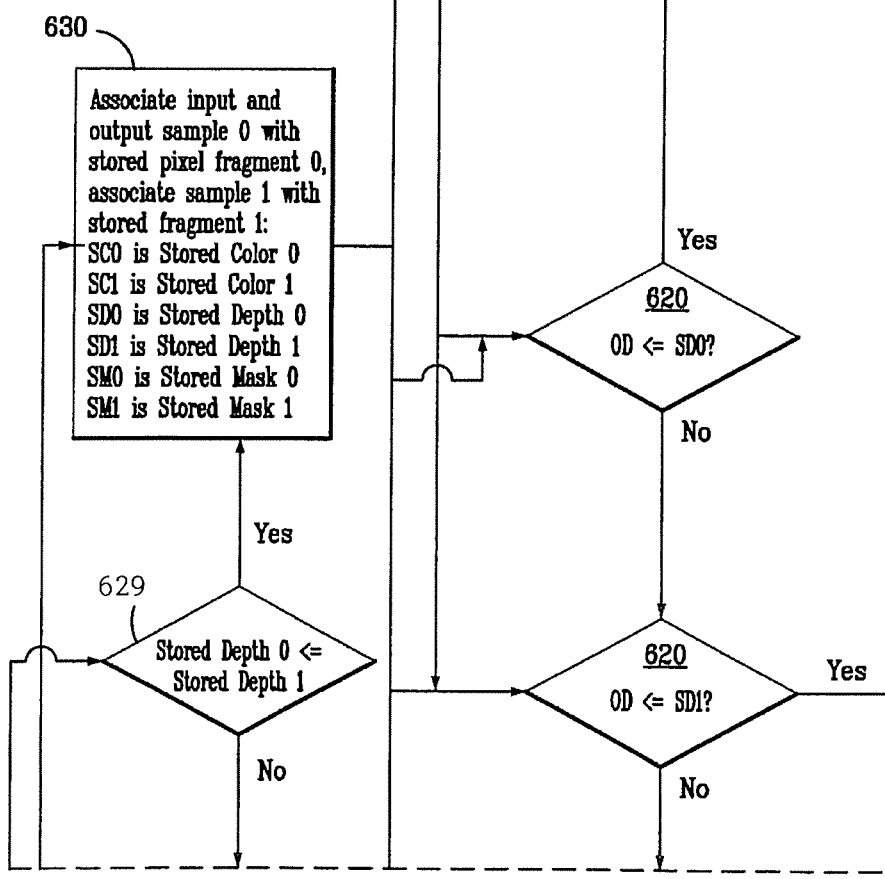

DYNAMIC FRAGMENT COVERAGE ANTIALIASING

PRIORITY CLAIM

The present application claims benefit under 35 U.S.C. §119(e) of provisional U.S. patent application No. 61/149,326 filed Feb. 2, 2009. The disclosure of the above-referenced provisional application is incorporated herein by reference.

BACKGROUND

Typically, computer graphics are generated onscreen using a graphics pipeline. For example, information including attached vertices may be input from a processor into the pipeline. Such information may be converted into a three dimensional world space comprised of primitives that may be transformed into a two dimensional image. Typically, the two dimensional image is constructed of small objects called fragments. Fragments include rasterized results of processed primitives that may be mathematically described polygons. Fragments may include, for example, assigned values describing their color, depth and other functions. Such fragments may be rendered as pixels for a two dimensional image on a visual display or print surface. Typically, the two dimensional image may be aliased or jagged when, for example, such fragments may be rendered. Unfortunately, to remove such aliasing or jaggedness, a large amount of memory and/or bandwidth of the system rendering the primitives as pixels may be consumed.

SUMMARY

The following discloses antialiasing systems and methods. In one embodiment, information about one or more fragments or primitives in a pixel area may be stored in the graphics pipeline. The stored information associated with graphical data may include, for example, depth, color, and location information. The stored information may also include coverage information including pixel coverage by the graphical data. According to an example embodiment, the stored information may be dynamically mapped. For example, the stored information may be associated with a location that the graphical data covers, without being tied to specific points in a pixel area. In one embodiment, the coverage information may be tracked at a higher frequency across the pixel than other information about the fragment or primitive. For example, a specified number of fragments may be stored per pixel area, however the number of coverage points in a pixel area that may track a fragment and be associated with a fragment when a fragment covers the pixel area may be greater by any factor, for example, 2x, or 2.5x, or any other rational number. Coverage may also be determined using analytical methods. For example, coverage may also be determined by parametric descriptions of polygon-pixel interception with processing algorithms, or triangle lists defining coverage volumes.

According to an example embodiment, first graphical data previously stored for a pixel may be compared with information about second graphical data that enters a pixel area. For example, information about second graphical data that enters a pixel area may be received and pixel coverage data may be associated with such graphical data. Features of the second graphical data that enters a pixel, including depth, coverage or any other feature may be compared with coverage information or other information associated with first graphical data that may be previously stored in the pixel. The first graphical data or the second graphical data that enters a pixel area may then be deleted based on the comparisons. If the first graphical data is deleted based on the comparisons, the second graphical data may be stored in its place. First graphical data that is not discarded may also be updated based on the comparisons. As used herein, first graphical data may imply one or more primitives or fragments, and second graphical data may also imply one or more primitives or fragments.

The preserved graphical data associated with a pixel area may then be written on a graphical display. In one embodiment, the preserved graphical data associated with the pixel area may be written on the graphical display after a resolve process. The resolve process may use relative coverage areas of the graphical data in a pixel for a weighted merging of the data in one embodiment. Additionally, the resolve process may take into account information in neighboring pixels when, for example, coverage points in a pixel area do not include graphical data associated therewith.

BRIEF DESCRIPTION OF THE DRAWINGS

FIGS. 6A-6D depict a flow diagram of an example embodiment of logic for dynamic fragment coverage antialiasing.

DETAILED DESCRIPTION OF ILLUSTRATIVE EMBODIMENTS

In the present application, graphical data in the graphical pipeline from the point of entry until the rasterization process is known as "primitives". Data in the graphical pipeline that may be used for creating a graphical output from the rasterization process until the end of the graphical pipeline is known as "fragments". Fragments and primitives are collectively called "graphical data".

Figure 1:
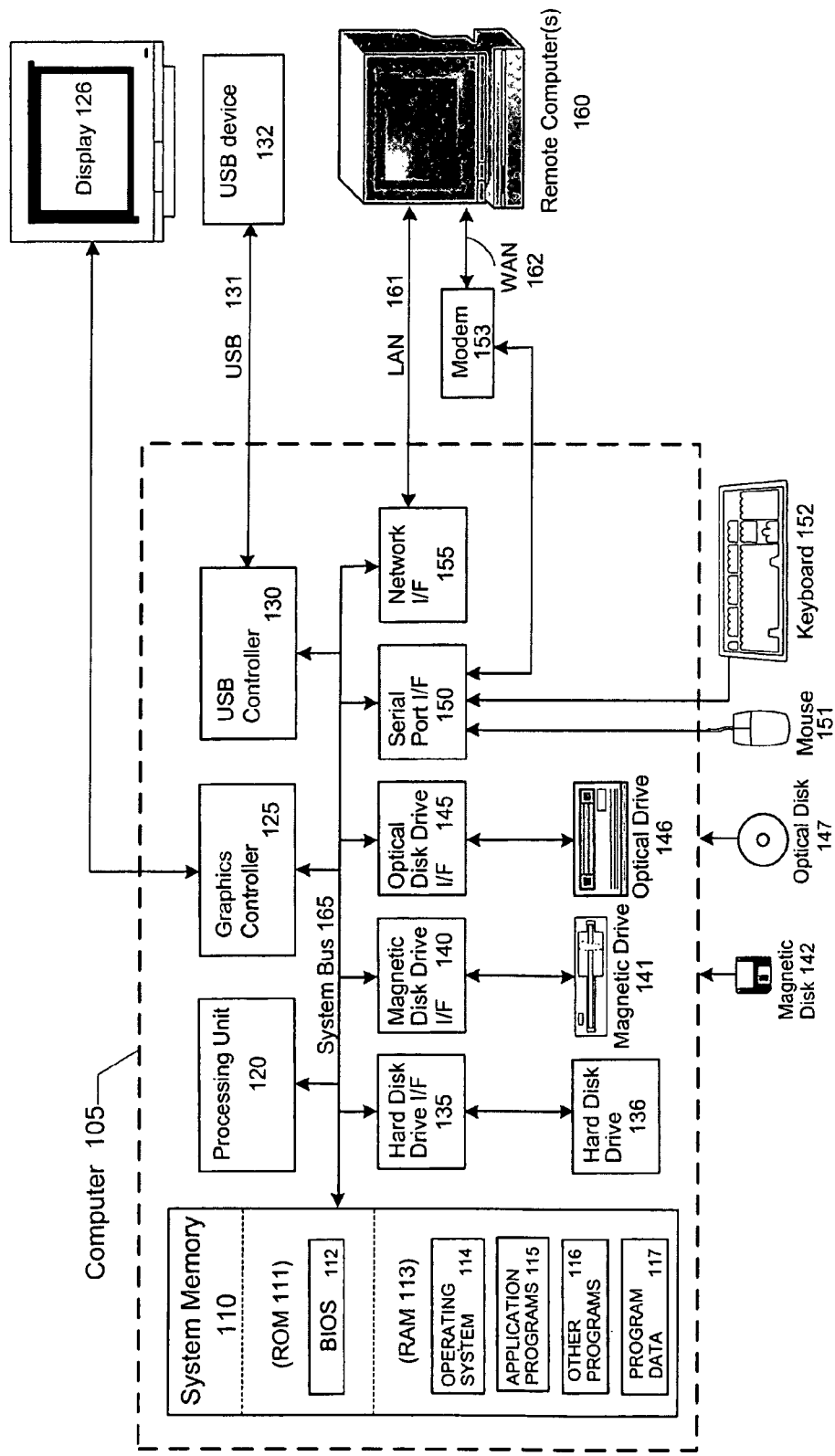
FIG. 1 depicts an example embodiment of an open computing system.

FIG. 1 depicts a block diagram of an example open computing environment in which dynamic fragment coverage antialiasing may be executed. For purposes of simplicity, not all components or interconnectivity are shown and some components have been merged into other components shown in FIG. 1. Although categorization may vary in degree from one system to the next, open computing environments are general purpose computing environments that may execute virtually any program while closed systems tend to be more specialized with one or more specific purpose(s) designed to execute, perhaps in addition to general programs, privileged programs specifically created for them. Examples of closed systems may include, for example, cable set top boxes, smart phones, gaming consoles and cellular telephones. Although not required, various aspects of dynamic fragment coverage antialiasing that may be executed may be described in the general context of computer executable instructions, such as program modules, being executed by a personal computer, client workstation, server or other computing system. Generally, program modules include routines, programs, objects, components, data structures and the like that perform particular tasks or implement particular abstract data types. Moreover, implementation of dynamic fragment coverage antialiasing may be practiced with other computer system configurations, including hand held devices, multi processor systems, microprocessor based or programmable consumer electronics, network PCs, minicomputers, mainframe computers, or the like. Further, dynamic fragment coverage antialiasing may be practiced in distributed computing environments where tasks are performed by remote processing devices that are linked through a communications network. In a distributed computing environment, program modules may be located in both local and remote memory storage devices.

A computer system may be roughly divided into three component groups: the hardware component, the hardware/software interface system component, and the application programs component (also referred to as the "user component" or "software component"). In various embodiments of a computer system the hardware component may comprise central processing unit (CPU) 120, memory (both ROM 111 and RAM 113), various input/output (I/O) devices such as keyboard 152, mouse 151, display 126, and/or printer (not shown), among other components. To some degree, initialization firmware such as basic input/output system (BIOS) 112 may be considered part of the hardware component as well as part of the hardware/software interface system component. The hardware component comprises the basic physical infrastructure for the computer system.

The application programs component comprises various software programs including but not limited to compilers, database systems, word processors, business programs, video games, and so forth. Application programs provide the means by which computer resources are utilized to solve problems, provide solutions, and process data for various users (machines, other computer systems, and/or end-users).

The hardware/software interface system component comprises (and, in some embodiments, may solely consist of) an operating system that itself comprises, in most cases, a shell and a kernel. As previously noted, firmware such as BIOS may also be considered part of the hardware/software interface system. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. In addition to performing initialization tasks, depending on the system BIOS may also provide some level of interface between hardware and software that may not be performed by the operating system. A purpose of a hardware/software interface system is to provide an environment in which a user may execute application programs.

The hardware/software interface system may be generally loaded into a computer system during initialization and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn.

The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system may also offload the management of batch jobs (e.g., printing) so that the initiating application may be freed from this work and may resume other processing and/or operations. On computers that may provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel may be a hardware/software interface system's innermost layer that interacts directly with the hardware components or their device drivers and/or the BIOS.

As shown in FIG. 1, an example open computing environment 100 in which in which dynamic fragment coverage antialiasing may be executed may include a conventional computing device 105 or the like, including processing unit 120, system memory 110, and system bus 165 that couples various system components including system memory 110 to processing unit 120. Computing device 105 may be any variety of computing device such as, but not limited to, a personal computer, laptop, hand-held computer, cellular phone or server. Processing unit 120 may comprise, for example, a CPU, Northbridge and Southbridge chipset with their well-known functionality, among other components. System bus 165 may be any one or all of several types of bus structures including a memory bus, peripheral bus and a local bus using any of a variety of bus architectures. System memory 110 includes read only memory (ROM) 111 and random access memory (RAM) 113. Basic input/output system (BIOS) 112, containing basic routines that help to transfer information between elements within the computing device 105, such as during initialization, may be stored in ROM 111. Among other functionality such as a power on self-test or POST as it is commonly known, BIOS 112 may include a computer initialization program such as a boot loader stage to load other initialization stages or load and turn over control to operating system 114. While the only BIOS shown is BIOS 112, some hardware devices such as optical drives may have their own BIOS or other necessary initialization firmware, which may be executed in addition to BIOS 112 during initialization of computing device 105. ROM 111 may include embedded memory, e.g., within the CPU of processing unit 120, and/or one or more discrete non-volatile memory devices, including flash memory.

Computing device 105 may further include hard disk drive 136 for reading from and writing thereto operating system 114, application programs 115, other programs 116, program data 117 or other information, magnetic disk drive 141 (e.g. floppy disk drive) for reading from or writing to removable storage 142 or other magnetic disk operating system 114, application programs 115, other programs 116, program data 117 or other information, and optical disk drive 146 for reading from or writing to removable optical disk 147, such as a CD ROM or other optical media, operating system 114, application programs 115, other programs 116, program data 117 or other information. Hard disk drive 136, magnetic disk drive 141, and optical disk drive 146 are connected to system bus 165 by a hard disk drive interface 135, magnetic disk drive interface 140, and optical disk drive interface 145, respectively. The example environment of FIG. 1 also includes universal serial bus (USB) controller 130, USB 131 and USB device 132 (e.g. removable USB flash memory or hard disk drive). USB device 132 may be coupled to system bus 165 via universal serial bus 131 and USB controller 130. The drives and their associated computer readable media provide non-volatile storage of computer executable instructions, data structures, program modules and other data for computing device 105. Similarly, USB device 132 may also comprise removable non-volatile memory such as a USB flash or hard drive, among a host of other devices. Although the example environment described herein employs hard disk 136, removable magnetic disk 142, removable optical disk 147 and removable USB device 132, it is well known that a computing system may employ many other types of fixed and removable, volatile and non-volatile computer readable media. Likewise, the example environment may also include many types of monitoring devices such as heat sensors and security or fire alarm systems, and other sources of information.

Data and any number of program modules comprising computer-executable instructions, such as BIOS 112 or other initialization program, operating system 114, application programs 115, other program modules 116 and data such as program data 117, may be stored on any one or more computer-readable mediums such as hard disk drive 136, magnetic disk 142, optical disk 147, ROM 111 (e.g. ROM, EEPROM, flash memories, eFuses), USB device 132, RAM 113 or any other discrete or embedded, volatile or non-volatile memories (not shown). A user may enter commands and information into computing device 105 through input devices such as keyboard 152 and a pointing device such as mouse 151. A wide variety of other input devices (not shown) may include, for example, a microphone, joystick, game pad, tablet or scanner. These and other input devices are often connected to processing unit 120 through a serial port interface 150 that may be coupled to system bus 165, but may be connected by other wired or wireless interfaces, such as a parallel port, game port, universal serial bus (USB) or Firewire. Display 126 or other type of display device may be also connected to system bus 165 via an interface such as graphics controller 125. In addition to display 126, computing devices typically include other peripheral output devices, such as speakers and printers (not shown).

Computing device 105 may operate in a local and/or wide area network environment using logical connections to one or more remote computers, such as remote computer(s) 160. Remote computer(s) 160 may be another computing device (e.g., personal computer), a server, a router, a network PC, a peer device, or other common network node, and typically includes many or all of the hardware, firmware and software elements described above relative to computing device 105. The logical connections depicted in FIG. 1 include a local area network (LAN) 161 and wide area network (WAN) 162 such as the Internet. Such networking environments are commonplace in offices, enterprise wide computer networks, intranets and the Internet. When used in a LAN networking environment, computing device 105 may be connected to LAN 161 through network interface 155. When used in a WAN networking environment, computing device 105 may include modem 153 or other means for establishing communications over WAN 162, such as the Internet. While modem 153, which may be internal or external to computer 105, is shown connected to system bus 165 via serial port interface 150, it may be connected in a variety of other ways. In a networked environment, program modules, or portions thereof, may be stored in a remote memory storage device. It will be appreciated that the network connections shown are exemplary and other means of establishing a communications link between computer 105 and remote computer(s) 160 may be employed.

While it may be envisioned that numerous embodiments of dynamic fragment coverage antialiasing are particularly well-suited for computerized systems, nothing in this document is intended to limit dynamic fragment coverage antialiasing to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

Dynamic fragment coverage antialiasing implemented in, for example, computer 105 may be implemented in connection with hardware, firmware or software or a combination thereof. Thus, the methods, apparatuses and systems for dynamic fragment coverage antialiasing, or certain aspects or portions thereof, may take the form of program code (i.e., instructions) and/or data embodied in tangible computer readable media, such discrete or embedded memories such as hard disk drives, magnetic disks, optical disks, USB devices, ROM memories, flash memories, eFuses or any other machine-readable storage medium, wherein, when the program code or data may be loaded into and executed or read by a machine, such as computer device 105, the machine becomes an apparatus for implementing dynamic fragment coverage antialiasing. The program(s) may be implemented in assembly or machine language, if desired. In any case, the language may be a compiled or interpreted language, and combined with hardware implementations. The methods and apparatuses for implementing dynamic fragment coverage antialiasing also may be practiced via communications embodied in the form of program code that may be transmitted over some transmission medium, such as over electrical wiring or cabling, through fiber optics, or via any other form of transmission, wherein, when the program code may be received and loaded into and executed by a machine, such as an EPROM, a gate array, a programmable logic device (PLD), a client computer, or the like. When executed by a processor, the program code combines with the processor to provide a unique apparatus that operates to invoke the functionality of dynamic fragment coverage antialiasing. Additionally, any storage techniques used in connection with dynamic fragment coverage antialiasing may invariably be a combination of hardware, firmware and software.

Figure 2:
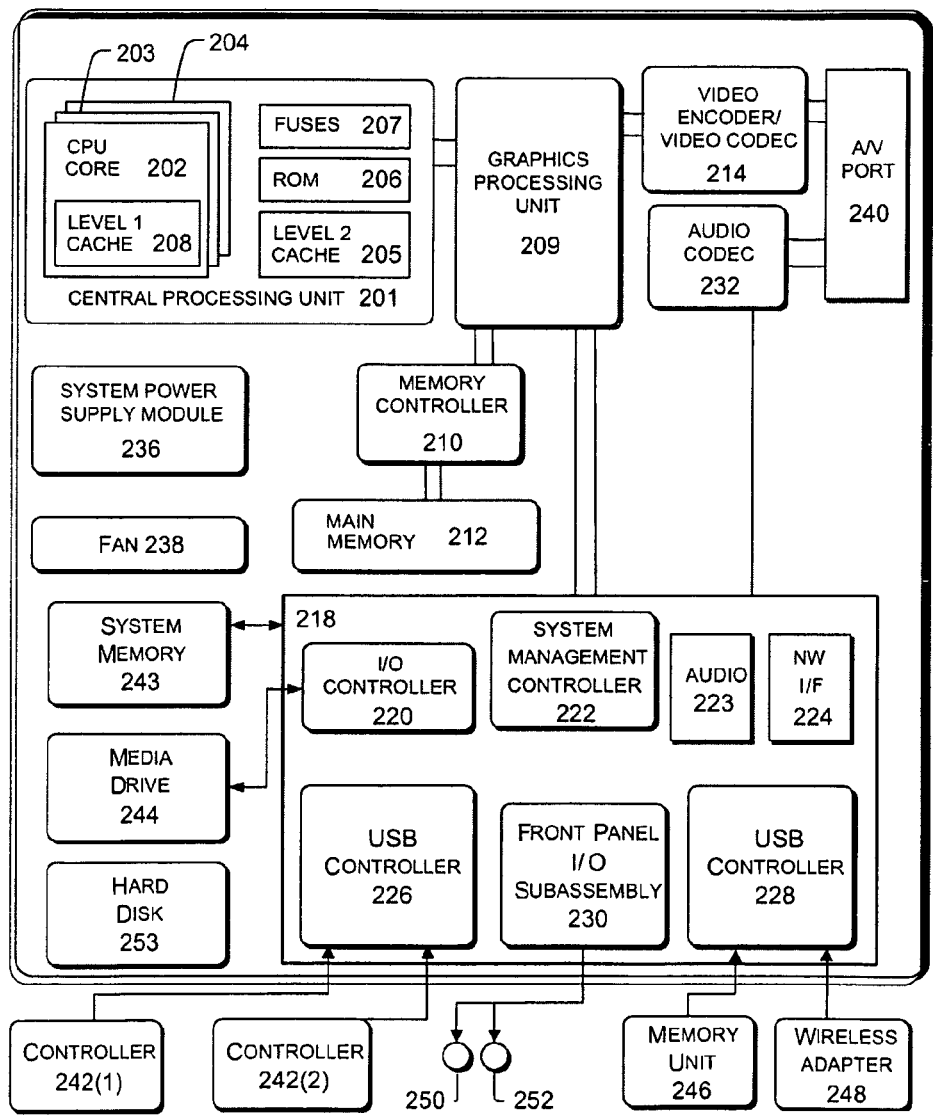
FIG. 2 depicts an example embodiment of a closed computing system.

Without limitation, FIG. 2 depicts a block diagram of an example closed computing environment in which various aspects of dynamic fragment coverage antialiasing may be implemented. Closed computing devices tend to be more specialized, or have at least one specialized purpose, relative to general purpose computing devices. Closed systems tend to have one or more specific purpose(s) designed to execute, perhaps in addition to general programs, privileged programs specifically created for them. Examples of closed systems may include, for example, cable set top boxes, smart phones, gaming consoles such as Microsoft's Xbox 360 and cellular telephones that execute one or more privileged programs. As an example of what makes the Xbox 360 a closed computing environment, at least in part, is that it is designed to gain restricted access to services such as Xbox LIVE and Xbox LIVE Marketplace located at http://www.xbox.com. Xbox, Xbox 360 and Xbox LIVE are registered trademarks of Microsoft Corporation, One Microsoft Way, Redmond, Wash. 98052-6399. Xbox LIVE is a full spectrum online gaming and entertainment service. Besides providing online multiplayer gaming, through Xbox Live and Xbox LIVE Marketplace, customers may download purchased and promotional content to their Xbox 360, including high definition and standard definition television shows, movies, gaming videos, music videos, short feature films, video games, dashboard themes, slideshows, gamer pictures, game trailers/demos, movies, game content such as new maps, weapons, levels, characters, challenges, expansions, arcade games, demos and trailers.

FIG. 2 depicts a block diagram of an example gaming console such as an Xbox 360. Game console 200 comprises hardware, firmware and software. Game console 200 comprises a computer system. Game console 200 executes game applications and plays generic and specialized media files (not shown). For purposes of simplicity, not all components or interconnectivity are shown and some components have been merged in example game console 200. Game console 200 comprises central processing unit (CPU) 201, which has multiple CPU cores 202, 203, 204, each having embedded cache such as level 1 (L1) cache 208. CPU 201 further comprises level 2 (L2) cache 205, ROM (Read-Only Memory) 206 and fuses 207. CPU cores 202, 203 and 204 may share L2 cache memory 205. Level 1 and Level 2 cache 208, 205 temporarily store executable instructions and/or data, thereby improving processing speed and throughput. ROM 206 may store firmware such as BIOS or other initialization programs and data loaded during an initial phase or stage of a boot process such as when game console 200 may be initially powered on. Alternatively, or in addition, the BIOS or other initialization programs and data loaded during one or more initialization phases/stages may be stored in another type of non-volatile memory such as flash (a type of EEPROM) memory, as may be represented by system memory 243, or fuses 207. In some embodiments, fuses 207 may be electronically programmable. In some embodiments, ROM 206, fuses 207, and alternative non-volatile memory storing initialization programs and/or data need not be embedded within CPU 201. However, physically locating memory devices that store initialization programs or data in CPU 201 may offer an added layer of security for such information. Game console 200 may optionally be a multi-processor system. For example, game console 200 may have three processors that are similar or dissimilar to processor 201.

Game console 200 further comprises graphics processing unit (GPU) 209, which may be coupled to CPU 201, and any additional processors, by a bus. GPU 209 may be also coupled by one or more busses each to memory controller 210, I/O (input/output) hub 218 and video codec (coder/decoder) 214. Memory controller 210 and video codec 214 may form part of GPU 209. GPU 209, in addition to video processing functionality, may comprise functionality commonly referred to as Northbridge. Northbridge functionality generally comprises a high speed memory and video hub having a memory controller and a video controller. In example game console 200, both CPU 201 and I/O hub (Southbridge) 218 access main memory 212 through Northbridge functionality in GPU 209. Memory controller 210 facilitates access to various types of main memory 212, which may be RAM (Random Access Memory) or other variety of memory.

GPU 209 and video codec 214 together form a video processing pipeline for high speed, high resolution graphics processing required by many game applications. Data may be carried from GPU 209 to/from video codec 214 via a bi-directional bus. This video processing pipeline outputs data to A/V (audio/video) port 240 for transmission to a television or other video display device (not shown). Game console 200 may have its own integrated display (not shown). Not shown is a digital to analog converter (DAC) that may be coupled between video codec 214 and A/V port 240.

Game console 200 further comprises I/O hub 218, which may comprise, among other functionality, functionality commonly referred to as Southbridge. Southbridge functionality generally performs and controls functions that are relatively slow compared to functions performed and controlled by Northbridge. I/O hub 218 comprises IO controller 220, system management controller 222, audio processing unit 223, network interface controller 224, USB host controllers 226, 228 and front panel I/O subassembly 230. USB controllers 226, 228 serve as hosts for peripheral controllers 242(1), 242(2), wireless adapter 248, and memory unit 246 (e.g., flash memory, CD/DVD ROM, hard drive, other removable media). Network interface 224 and/or wireless adapter 248 provide access to a network (e.g., LAN, WAN or Internet) and may be any of a wide variety of various wired or wireless interface components including an Ethernet card, modem, Bluetooth module, and the like.

System memory 243 may be volatile and/or non-volatile memory, including flash memory. In some embodiments system memory 243 may store all or a portion of the initialization program and data (e.g. various boot loader stages) and operating system that may be loaded during the initialization boot process. In other embodiments, system memory 243 may store application data, game saves and downloads. Media drive 244 may comprise, for example, a DVD/CD drive, hard drive or other fixed or removable media reader and/or writer. Game application data may be read from and/or written to media via media drive 244 for execution, playback, etc. by game console 200. Media drive 244 may be connected to I/O controller 220 via a bus, such as a Serial ATA bus or other high speed connection (e.g., IEEE 5394). Game console 200 may include hard disk 252, which may be used, for example, to store all or a portion of the initialization program and data (e.g. various boot loader stages) and operating system that may be loaded during the initialization boot process, game applications, game data or other types of data.

System management controller 222 provides a variety of service functions for game console 200. Audio processing unit 223 and audio codec 232 form a corresponding audio processing pipeline that may provide high fidelity, 5D, surround, and stereo audio processing of sounds produced by, for example, a game application. Audio data may be carried between audio processing unit 223 and audio codec 232 via a communication link. The audio processing pipeline outputs audio data to A/V port 240 for implementation by a device having audio capabilities.

Front panel I/O subassembly 230 supports the functionality of various controls such as power button 250 and eject button 252, as well as any LEDs (light emitting diodes) or other indicators exposed on the outer surface of game console 200. System power supply module 236 provides power to components of game console 200 while fan 238 cools them.

CPU 201, GPU 209, memory controller 210, and various other components within game console 200 are interconnected via one or more buses, including serial and parallel buses, a memory bus, a peripheral bus, and a processor or local bus using any of a variety of bus architectures. As previously noted, not all buses or other connections and components are shown in FIG. 2.

When game console 200 may be powered on or rebooted, aside from initialization, application data and/or instructions may be loaded from system memory 243, media drive 244, hard disc 253 or other memory into main memory 212 and/or caches 205, 208 and executed on CPU 201. The game application being executed may present a graphical user interface that provides a consistent user experience when navigating to different media types available on or to game console 200. Instructions and/or data accessible via media drive 244, system memory 243, hard disk 253 or other memory may be launched, played or otherwise accessed from these various sources to provide additional functionality to game console 200.

Game console 200 may be operated as a stand-alone system by connecting the system to a television or other display. As previously noted, game console 200 may have an integrated display. In this stand-alone mode, game console 200 may allow one or more users to interact with the system, watch movies, listen to music, play games and the like. Network interface 224 or wireless adapter 248 may allow game console 200 to be operated as a participant in a local or wide area network community such as Xbox LIVE.

Figure 3:
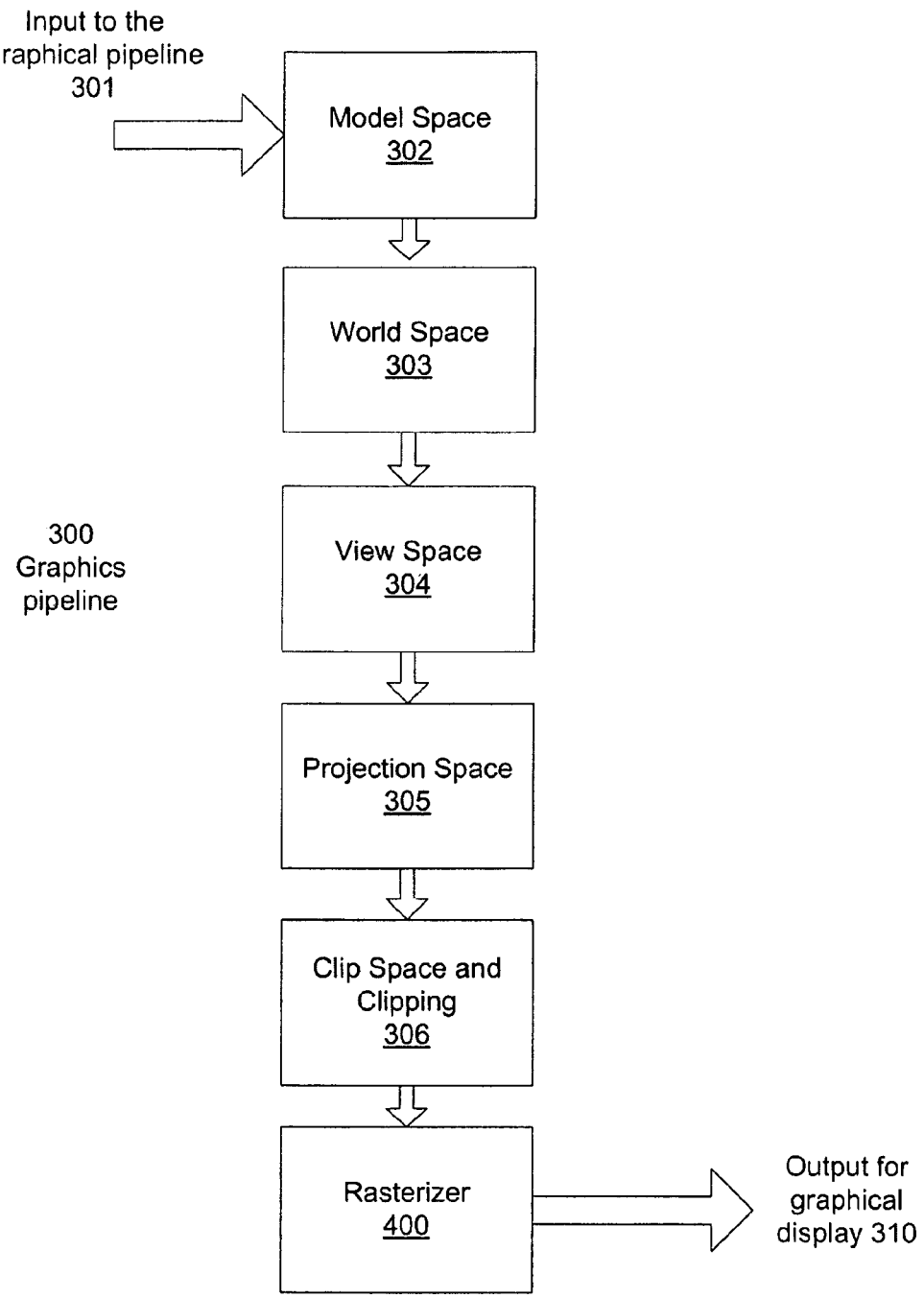
FIG. 3 depicts a block diagram of an example embodiment of a graphics pipeline.

FIG. 3 depicts a block diagram of an example embodiment of the front end of graphical pipeline 300. The graphical pipeline 300 may be used to, for example, render an output to provide to a rasterizer and dynamic fragment coverage antialiasing logic disclosed below. The dynamic fragment coverage antialiasing logic may be used to determine the fragments to be used for shading a pixel that may be displayed via a display device such as the display 126 described above with respect to FIG. 1. The graphical pipeline 300 may be mapped onto graphics acceleration hardware in, for example, the graphics controller 125 described above with respect to FIG. 1 or the GPU 209 described above with respect to FIG. 2.

The graphical pipeline 300 may include hardware components such as servers, controllers, databases, processors, storage drives, registers, cache, RAM memory chips, data buses, or the like and/or software components such as graphics rendering applications.

According to one embodiment, the graphical pipeline 300 may convert a three-dimensional model or scene received from a processor into the 2D output that may be displayed via a display device. For example, the graphical pipeline 300 may receive input data 301 including, for example, a graphical model from, for example, the CPU 201 described above with respect to FIG. 2. The input data 301 may include primitives, which may include mathematical polygons such as triangles, hexagons, or the like that may be modeled in a modeled scene such as a model space 302. In an example embodiment, a coordinate system may be established such that primitives may be properly situated in the three-dimensional model space 302. The model space 302 may be converted into a three-dimensional world space 303, a view space 304, and a projection space 305. It may be converted in discrete individual stages, a single stage resulting from a concatenation of matrix transforms, or any combination thereof.

The graphical pipeline 300 may clip and process primitives expressed in projection space from transformation 305 after the primitives have been transformed from view space, and after primitives in projection space are transformed to clip space 306. The graphical pipeline 300 may provide the clipped and processed contents of the three-dimensional scene from the clipping unit into the rasterizer 400. According to one embodiment, the transformed projected view may be established by, for example, placing a virtual "camera" in the three dimensional world space 303. In one embodiment, the virtual camera may be positioned based on a location of, for example, a user that may view the two-dimensional output via a display device. Based on the positioning of the virtual camera, a coordinate system may be established for view and projection space.

The graphical pipeline 300 may also provide, for example, the clipped and processed scene data for further processing in dynamic fragment coverage antialiasing logic that may be used to determine which fragments should be sent to a final resolve process for output to a display such as 126 described above.

The graphical pipeline 300 may further rasterize the clipped scene. For example, the graphical pipeline 300 may include a rasterizer 400. According to an example embodiment, the rasterizer 400 may render primitives associated with the clipped data from clip space 306 into fragments that may form a graphical image 310. For example, the clipped data from clip space 306 may be divided into a two dimensional array of pixels. The rasterizer 400 may then render the primitives into pixel areas that may form a graphical image 310. The graphical image 310 may be output to a display device such as the display 126 described above with respect to FIG. 1. According to an example embodiment, the rasterizer 400 may also provide antialiasing on the scene 306 during rendering of the graphical image 310.

Figure 4:
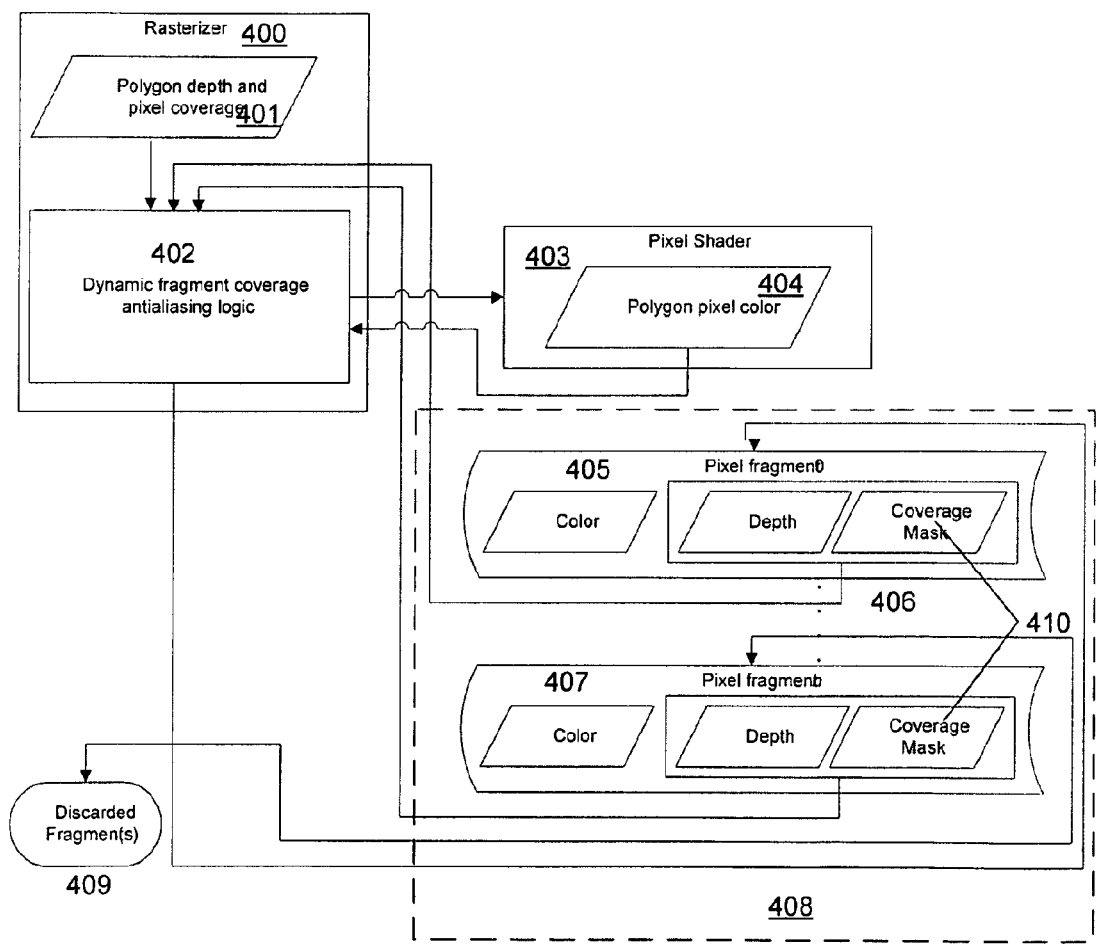
FIG. 4 depicts a block diagram of an example embodiment of a system that may include dynamic fragment coverage antialiasing logic.

FIG. 4 depicts an example embodiment of a block diagram of the data flow for dynamic fragment coverage antialiasing. According to an example embodiment, as described above the rasterizer 400 may associate information such as primitives 401, data from the shader 404, and fragments 405, 407 that may be in a graphical pipeline such as the graphical pipeline 300 with one or more pixels based on the locations of the graphical data in a two dimensional scene. According to an example embodiment, primitives may be rasterized into fragments that represent one or more sub pixel areas that may be inside, in whole or in part, of a pixel area.

The primitives 401, data from the shader 404, and fragments 405, 407, and pixel data may include information or data that may represent at least a portion of an object in three dimensional world space such as the three dimensional world space 302 described above with respect to FIG. 3. For example, as shown in FIG. 4, the information or data associated with the primitives 401, data from the shader 404, and fragments 405, 407, and pixels may include location data, shader and lighting information, projected depth in the three dimensional world space including, for example, the distance to an object from the virtual camera in a projected scene, position, texture coordinates, normal vector, tangent vector, binormal vector, blend weights, blend indices, tessellation terms, material information, colors, fog information, stencil data, translucency information, motion information, lighting and material information (e.g. deferred rendering), or the like.

According to an example embodiment, the primitive 401 may be received by the rasterizer 400 from, for example, the CPU 201 described in FIG. 2 and/or from previous stages in a graphical pipeline such as the graphical pipeline 300 described in FIG. 3. As described above the primitive 401 may include primitive information associated therewith including, for example, location information or any other suitable information associated with the primitive 401 as described above.

As shown in FIG. 4, the rasterizer 400 may include dynamic fragment coverage antialiasing logic 402. The dynamic fragment coverage antialiasing logic 402 may include hardware components such as servers, controllers, databases, processors, storage drives, registers, cache, RAM memory chips, ROM memory chips, data buses, or the like and/or software components such as graphics rendering applications.

According to one embodiment, the dynamic fragment coverage antialiasing logic 402 may provide stored information including, for example, fragments 405, 407 and/or or the shader data 404. In an example embodiment, the stored information including, for example, fragments may have been stored during previous renderings of graphical images on a display such as display 126 described above in FIG. 1 and/or in prior dynamic fragment coverage antialiasing logic sequences 402. The stored graphical data may include information such as shader and lighting information, projected depth in space including, for example, the distance to an object from the virtual camera in a projected scene, position, normal vector, tangent vector, binormal vector, colors, fog information, stencil data, translucency information, motion information, lighting and material information (e.g. deferred rendering), or the like.

According to an example embodiment, the dynamic fragment coverage antialiasing logic 402 may include information 401, 405, and 407, and other data such as shader data 404. The dynamic fragment coverage antialiasing logic 402 may, for example, compare the fragments or primitives based on the information associated therewith including, for example, depth, coverage area within a pixel, location, intensity, or the like. In an example embodiment, the dynamic fragment coverage antialiasing logic 402 may be triggered upon entry of new information such as a primitive or a fragment into a pixel area.

According to one embodiment, the dynamic fragment coverage antialiasing logic 402 may divide a pixel space into coverage areas and associate the divided coverage areas with individual points in the coverage area. These points may be used to, for example, determine which fragments or primitives cover the point. In an example embodiment, when a coverage point in a coverage area is covered by a primitive or fragment, the larger coverage area is associated with the fragment or primitive that covers the point. This association may take the form of a coverage mask, where the coverage mask may be implemented by a single binary string having a place holder for each coverage area in a pixel that may be a 1 if a particular fragment or primitive is associated with the coverage area, and that may be 0 if a fragment or pixel is not associated with that area.

According to an example embodiment, a primitive or fragment may be evaluated for the depth of the primitive at several points across the primitive based on its coverage of a pixel area. Dynamic fragment coverage antialiasing logic 402 may average the depth of the primitive or fragment at each of the visible (i.e. non-occluded) coverage points on a pixel and associate a single depth term with the visible portion of the fragment that covers a pixel area.

The dynamic fragment coverage antialiasing logic 402 may also include a comparison logic 410. The comparison logic 410 may compare the depth or coverage area of two or more fragments or primitives in a pixel area. According to one embodiment, if, for example, two or more fragments or primitives occupy the same coverage point in the two dimensional space in a pixel area, but one or more of the fragments or primitives may be located in front of another based on the depth in a projected view such as the projected view from the projection space transform 305, the covered portion of the primitive or fragment of farther depth may be discarded. The coverage point may then be associated with the fragment or primitive having the nearest distance to the projected view. The comparison logic 410 may also perform additional comparisons of the information associated with the primitives and fragments including, for example, the coverage area of the pixel, the intensity or color, or any other suitable information associated with the primitives or fragments, or both.

According to an example embodiment, each pixel area may have two or more stored fragments or primitives associated therewith. Additionally, each fragment or primitive may include information such as coverage, color, depth, translucency, intensity or the like associated therewith. In one embodiment, the coverage of the pixel may be expressed through discrete two dimensional point locations maintained at a higher frequency than the number of fragments or primitives associated with each pixel. For example, the number of coverage points may be greater than the number of fragments stored. In one embodiment, the number of coverage points may be a factor greater than the number of stored fragments, where the factor may be any number greater than one. In one embodiment, the coverage, color, depth, translucency, intensity and other information associated with each fragment or primitive may be stored per fragments or primitives, and have associated therewith, one or more coverage points in a pixel depending on the coverage area.

According to an example embodiment, graphical data may be stored at any location in a pixel area where the graphical data has non-occluded pixel area coverage. Such information or data associated with fragments or primitives as described above may be stored in a single instance and have the coverage of the pixel area associated with the fragment information. Thus, the stored data for each fragment may be associated with a dynamic area of the pixel and its visibility is not tied to a single fixed point location within the pixel space.

Additionally, when a primitive or fragment enters into a pixel area, a comparison of depth may take place between it and each of the primitives or fragments stored for the pixel. If coverage of the entering fragment intersects with the coverage of a stored fragment, the intersecting coverage area may associate with the fragment that is nearer in depth to the projected view and disassociate with the fragment that is further away. Such visibility association may be used with size of fragment areas in prioritizing the importance of various fragments relative to one another.

The dynamic fragment coverage antialiasing logic 402 may also rank fragments or primitives based on the comparisons described above. For example, the dynamic fragment coverage antialiasing logic 402 may determine a ranking associated with for example, which portions of a pixel area may have more non-occluded coverage by a primitive or fragment and, thus, which fragments should be discarded or preserved for ultimate display. According to an example embodiment, the rankings may be used to discard a fragment such as 407, or to store a fragment, or any combination thereof.

As shown in FIG. 4, dynamic fragment coverage antialiasing may include a pixel shader 403. The pixel shader 403 may include hardware components such as servers, controllers, databases, processors, storage drives, registers, cache, RAM memory chips, ROM memory chips, data buses, or the like and/or software components such as graphics rendering applications such that the pixel shader 403 may determine fragment color, modify depth, and modify coverage based on any information associated with determination of such data in the fragment or primitive.

According to one embodiment, the pixel shader 403 may output shader data 404. The shader data 404 may be used in a graphics pipeline such as the graphical pipeline 300 to shade a pixel that may be displayed. The shader data 404, including for example modified coverage, may also be provided to the dynamic fragment coverage antialiasing logic 402 for use in reevaluating fragment visibility and priority of preservation.

According to an example embodiment, the depths and coverage masks 410 associated with stored pixel fragments 405 to 407 may be used in conjunction with the depth and coverage mask 401 associated with a primitive or fragment produced by the rasterizer 400 to determine information about the coverage of a pixel by the stored and rasterized fragments. Such information may be used to compare, rank, cull, modify, and store fragments or primitives. For example, as shown in FIG. 4, the coverage mask associated with fragment 407 may be modified to reflect the fragment's updated non-occluded visibility after comparison in the dynamic fragment coverage antialiasing logic with one or more primitives or fragments as described above. According to an example embodiment, the coverage mask may be compared with any suitable information associated with the primitives and fragments mentioned above including, for example, depth, pixel coverage area, location, intensity, color, or the like.

Updates to the coverage masks of 410 by the dynamic fragment coverage antialiasing logic 402 may also bring about the eviction of, for example, the fragment 407 based on comparisons such as depth and coverage or the like. According to example embodiments, the depths and coverage masks 410 may be used by the dynamic fragment coverage antialiasing logic to modify coverage of fragments or primitives. Modification of coverage alters the relative areas occupied by the fragments in a pixel and may thereby effect a discarding of the primitives or fragments of less importance. Modification may also result in the storage of rasterized fragments determined to have greater importance. In one embodiment, the dynamic fragment coverage antialiasing process may be provided information about the depths and coverage masks 410 including, for example, the fragments 405, 407 such that the antialiasing logic 402 may use the information to determine which fragments or primitives may be discarded and when a primitive fragment produced by the rasterizer 400 may be preserved.

According to an example embodiment, dynamically mapped primitive or fragment information may be associated with a portion of a pixel, where the portion of the pixel may change in area and location. In one embodiment, the process for dynamically mapping location and area may involve placing a grid or asymmetrical pattern of coverage points in a pixel area that may be associated with one or more primitives or fragments when they are covered by each primitive or fragment. As a scene changes and another primitive or fragment may be introduced into a pixel area, the coverage points in the pixel area with which the introduced primitive or fragment intersect, and the occlusion or non-occlusion of the primitive at those points with respect to fragments previously introduced into the pixel area, may update the coverage information for both the introduced and previous fragments to associate coverage locations with stored fragment information. Thus, in an example embodiment, dynamically mapping location may involve updating the location of the coverage with the other data associated with each fragment or primitive each time a primitive or fragment enters a pixel area.

As described above, the pixel shader 403 may include a software or hardware module that may be used to shade pixel fragments rendered in a graphical pipeline such as the graphical pipeline 300 together to determine information about a pixel such as color, intensity, or the like. The pixel shader 403, or alternatively a dedicated resolve processing logic unit, may also merge pixel fragments together to form a final pixel value for display, possibly using information from neighboring pixels, primitives or fragments or any other available information. Thus, in an example embodiment, the pixel shader 403 may combine fragment information, including color, depth, intensity, coverage, or any other information associated with the fragments of a pixel, its neighbors, or any combination thereof.

Figure 5:
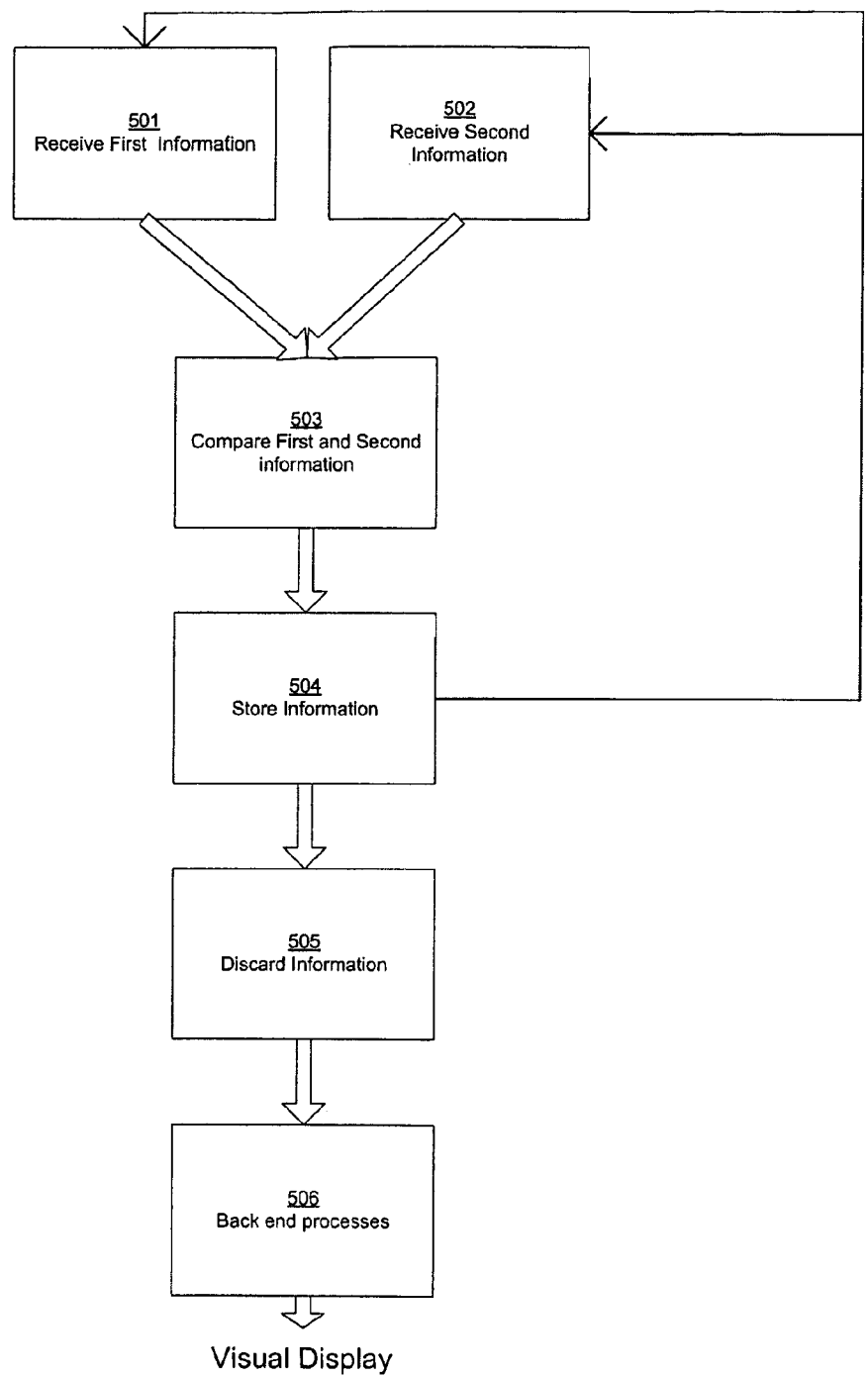
FIG. 5 depicts a flow diagram of an example embodiment of a method of dynamic fragment coverage antialiasing.
Figure 6B:
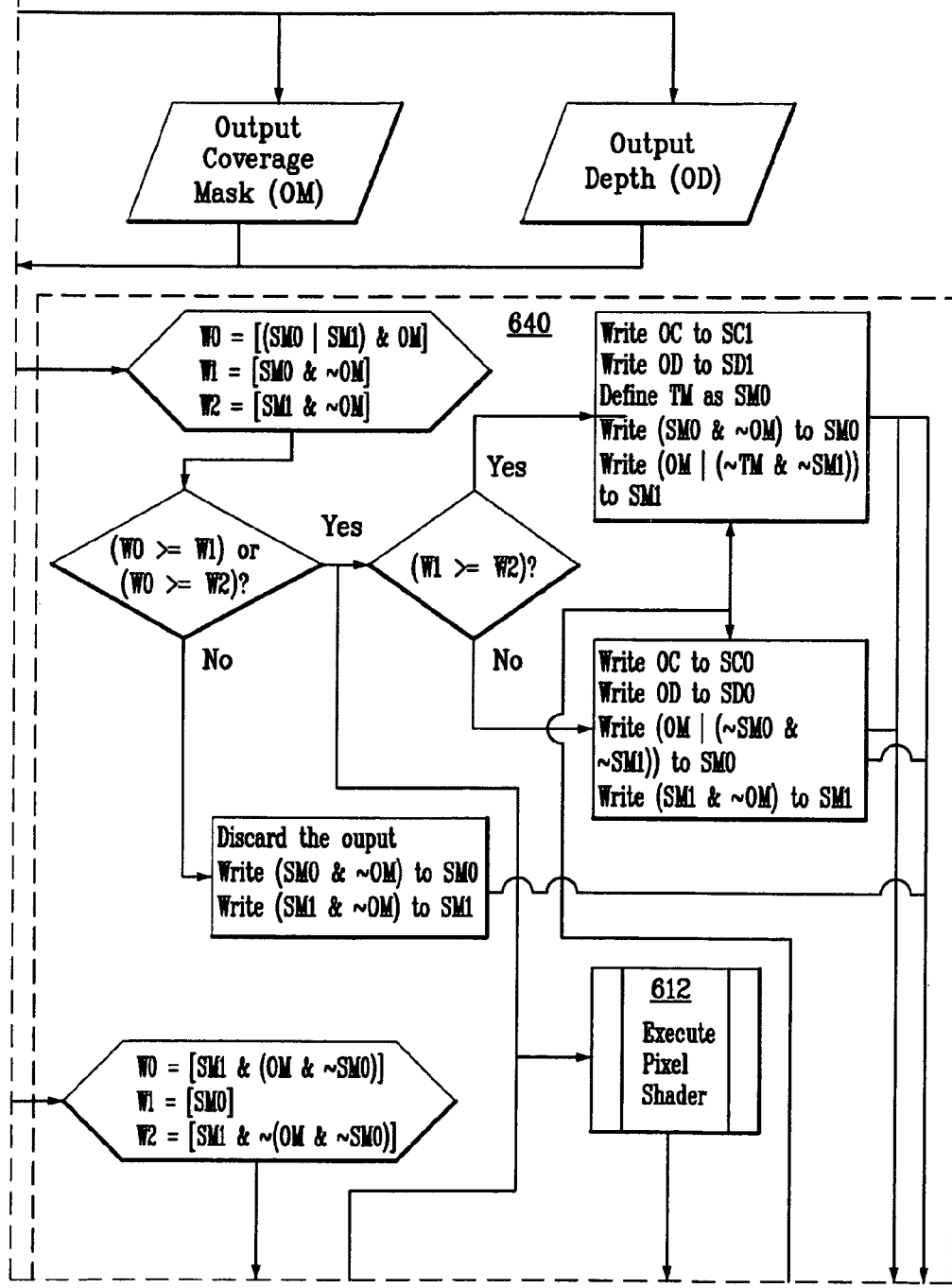
Figure 6C:
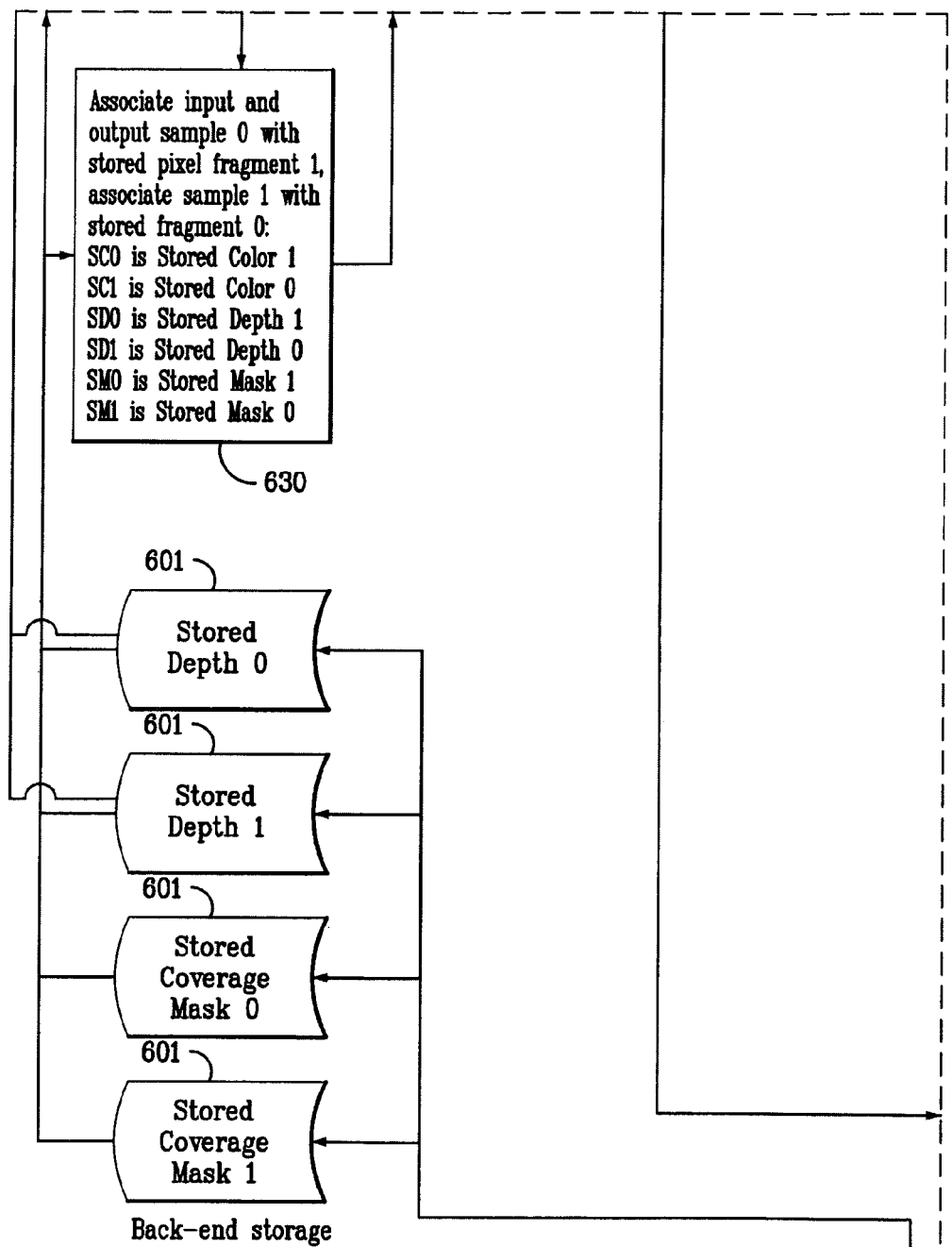
Figure 6D:
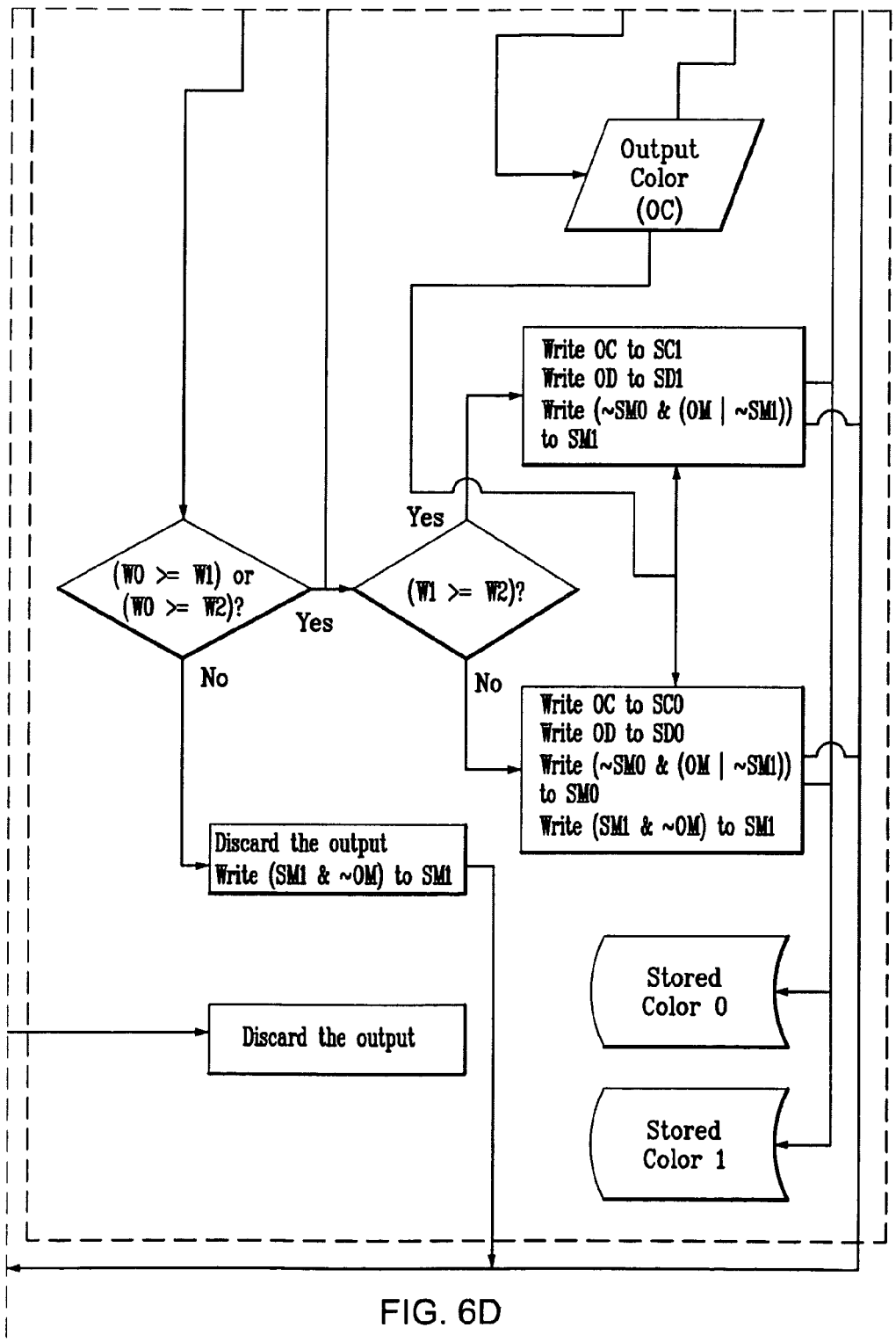

FIG. 5 depicts a flow diagram of an example method 500 of dynamic fragment coverage antialiasing. The example method 500 may be implemented using, for example, the dynamic fragment coverage antialiasing logic 402 described above in FIG. 4. At 501, first information associated with one or more first primitives or fragments may be received by, for example, antialiasing logic such as the dynamic fragment coverage antialiasing logic 402 described above with respect to FIG. 4. The antialiasing logic may be included in, for example, a rasterizer such as the rasterizer 400 that may render a two-dimensional output in a graphics pipeline such as the graphical pipeline 300. According to an example embodiment, the first information of the first primitives or fragments may have been previously analyzed by the dynamic fragment coverage antialiasing logic and stored. Such first information may have been used in previous rendering of a graphical data by the dynamic fragment coverage antialiasing logic. The first information may include a set of one or more fragments or primitives that may have been previously analyzed and stored.

At 502, second information of a second primitive or fragment may be received by, for example, the dynamic fragment coverage antialiasing logic. According to one embodiment, the second information may be received upon entry of a second dynamically mapped primitive or fragment into a pixel area. The second information may also include a set of one or more fragments or primitives that may enter a pixel area.

At 503, the depth and coverage of the first and second fragments or primitives may be compared. For example, the antialiasing logic may include a comparison logic such as the comparison logic 402 described above with respect to FIG. 4. In one embodiment, the first and second fragments or primitives may be compared based on their relative depths in the pixel area and their coverage of the pixel using, for example, the comparison logic. Comparisons of any other information included in the first and second primitive information of the first and second primitives, as described above with respect to FIG. 4, may also be performed by, for example, the comparison logic at 503.

At 504, the first or second information may be stored. For example, the antialiasing logic may store the first or second primitives or fragments based on, for example, the comparisons at 503. For example, the first and second primitives or fragments may be compared according to their coverage area determined by, for example, a comparison of the first and second graphical data at 503. The first and second primitives or fragments may also be compared based on any combination of information associated with them as described above.

First or second information stored at 504 may be used in later implementations of dynamic fragment coverage antialiasing. The stored information may be received by the dynamic coverage antialiasing logic as the first or second information in 501 and 502.

At 505, graphical data may be discarded. For example, the antialiasing logic may discard one or more of the first or second primitives or fragments. According to an example embodiment, the antialiasing logic may discard one of the first and second primitives or fragments based on comparisons of their coverage, depth or other information. For example, the graphical data having less non-occluded coverage may be discarded at 505. At 505, a primitive or fragment such as the first or second primitive or fragment may also be discarded for other reasons, including, but not limited, to a lack of pixel coverage area, depth, locations, or the like that may be used to compare the graphical data.

At 506, a fragment associated with the information not discarded may be sent through a back end process and undergo resolve for display on a display device such as the display 126 described above with respect to FIG. 1.

In an example embodiment, other common graphical pipeline elements are considered and incorporated in the dynamic fragment coverage antialiasing implementation. These other elements include a logical process for handling output merging (translucency), stencil operations, and alpha-to-coverage conversions. In one embodiment, incorporating output merging with dynamic fragment coverage antialiasing may cause the logic to run additional depth and coverage comparison steps involving multiple sub-fragments from the rasterizer. In another embodiment, stencil operations may be applied in the modification of rasterized fragment coverage and stencil updates performed on stored fragments based on relative occlusions in a pixel area. Another embodiment involving alpha-to-coverage conversions of pixel shader alpha output to pixel coverage may cause the dynamic coverage antialiasing logic to repeat coverage comparisons after shader execution. Another embodiment contains a programmable logic for resolve, wherein the logic may either perform a direct weighted merging of fragments based on relative coverage, or a more involved merging of the fragments of a pixel and its neighbors in the reconstruction of data for areas in a pixel with no associated fragment coverage. Dynamic fragment coverage antialiasing may also comprise logical steps for compatibility and control of depth testing, depth writes, stencil testing, output color masking, output merging, alpha testing, coverage masking, shading, and conservative depth. Any other processes that may be associated with graphical pipelines may be incorporated as elements of dynamic fragment coverage antialiasing.

Example Implementation

The following description is illustrative of how dynamic fragment coverage antialiasing might interact with other elements in the graphical pipeline. In an embodiment, the dynamic fragment coverage antialiasing logic may be implemented as part of the rasterizer in the graphics pipeline, with control over pixel shader execution, output merger (e.g. alpha blending) operation, and back-end updates to stored color, depth, and coverage information. In addition to its influence on straightforward rasterization, dynamic coverage antialiasing also has implications for translucent rendering, stencil processing, and alpha-to-coverage conversion of fragment translucency to modified coverage.

FIGS. 6A-6D show an example implementation of dynamic fragment coverage antialiasing comprising depth and coverage information of stored fragments 601 and the logic that may be used to determine whether to store or discard an incoming fragment 602 (produced by the rasterizer) based on the depth 602A and coverage 602B of the fragment relative to the stored fragments 601. According to example embodiments, dynamic fragment coverage antialiasing may include storage for a programmable number of fragments and may be programmable to change the comparisons that the logic makes and the parameters on which the logic bases the decisions to store or discard a fragment.

Inputs to the logic may include stored fragments 601 from previous iterations of the logic and fragment 602 received by the logic from the rasterizer. In the example embodiment, the fragment 602 in the logic depicted at FIGS. 6A-6D may be processed such that its depth is calculated from its associated primitive at each coverage point in a pixel area. The per-coverage-location depth values of the fragment 602 are initially tested against the depth values associated with the stored fragments in locations of intersecting coverage, and the coverage of the fragment 602 is eliminated at all locations where the depth test fails. For coverage locations where the depth test succeeds, the rasterized depth may be interpolated to form an average depth value for the fragment 602. This average value is represented as a portion of the fragment 602 referred to as output depth (OD) in FIGS. 6A-6D.

Referencing the interpolated depth value, the depth comparison logic 620 evaluates it against the depth of the stored fragments 601. Coverage comparison logic 640 next evaluates the output coverage of the fragment 602 against the coverage of the stored fragments for relative visibility. Typically, in quantifying visible coverage and comparing it between incoming and stored pixel fragments, areas of the pixel occupied by the stored fragments are taken into account and areas of the pixel not occupied by the stored fragments may be discounted.

If the fragment 602 is nearer or equal in depth to the nearest of the stored fragments 601 (assuming a depth comparison mode of less-or-equal) but has a minority coverage, its color and depth are discarded and its coverage mask is used to mask off intersecting portions of the coverage masks of both stored fragments. If the fragment 602 has more than minority coverage (its output coverage as compared against the stored coverages masked off by the output coverage), it is kept. If the fragment 602 is retained, its coverage mask is stored as the calculated coverage of the intersecting primitive and the uncovered pixel portions of the two stored fragment samples (effectively filling the dead coverage spots with the rasterized fragment's influence). To make room for the incoming fragment, the stored fragment with the lesser coverage is removed by having its storage overwritten with the incoming fragment. The coverage area for the other stored fragment is modified such that its coverage has the coverage of the incoming fragment masked off from it.

If the depth comparison logic 620 is provided a fragment 602 which has a depth value that is farther than the nearest stored fragment but nearer or equal in depth to the farthest stored fragment, its output coverage is masked off by the coverage of the nearer stored pixel fragment and it, in turn, masks its coverage off the coverage of the farther stored pixel fragment. The resulting coverage areas of the three fragments are then compared to one another by the logic 640. If the fragment 602 has minority coverage, its coverage is masked off the coverage of the farther stored pixel fragment and it is discarded. If the fragment 602 does not have the minority coverage, the two stored fragment 601 coverage areas are compared for minority contribution to see which one to reject. The minority fragment is replaced directly by the fragment 602 and the coverage for the fragment 602 is set to its non-occluded primitive coverage combined with the complement of the coverage of the evicted fragment, with the resulting coverage finally masked off by the coverage of the nearer stored fragment. If the nearer stored fragment is the one replaced, the farther stored fragment's coverage is masked off by the fragment's 602 coverage.

If fragment 602 is found by the depth comparison logic to be farther than the farthest stored pixel fragment, the fragment 602 is discarded completely and has no effect on the coverages of either stored fragments 601.

Note that the pixel shader 612 may be executed when the depth and coverage comparison logic determines that a fragment 602 is to be preserved in storage. The pixel shading logic may be reserved because of high computational cost except when the logic determines that particular fragment information may have an effect on the final value of the pixel.

FIGS. 6A-6D present an example embodiment for the operation of dynamic coverage antialiasing in the context of opaque rendering. Another example embodiment for the processing of translucent rendering (i.e. output merging enabled) involves an expansion of the opaque implementation. A fragment 602 produced for translucent rendering may have its visible coverage area reduced according to the coverage of two or more stored fragments 601 for the pixel. If the intersecting visible coverage of the fragment with the stored fragments is empty, the fragment 602 has nothing with which to blend and it is rejected. Otherwise, unless the fragment 602 is nearer or equal in depth to the second furthest stored fragment, antialiasing proceeds as described for the opaque case but with the fragment's 602 color blended with the farthest stored fragment in the event that it is to be preserved. If the fragment 602 is nearer or equal in depth to the second furthest stored fragment, the restricted coverage of the fragment 602 is further split according to the coverage separation of the stored pixel fragments 601 that do not occlude the fragment 602. The antialiasing logic then evaluates the relative areas of the two or more portions of the divided fragment against the areas of the two or more stored fragments 601 not occluded by any portion of the divided fragment. Of the four or more potential regions, the two or more regions with the greatest coverage will be preserved and the two or more with the least coverage rejected or evicted.

An example embodiment involving the processing of stencil may cause the implementation to be extended such that the coverage of a fragment 602 is bifurcated according to the division of the destination pixel into its stored fragments 601 based on their coverages, and each split portion applies a stencil test to its associated fragment in storage. The stencil test result may be applied in the partial rejection of a fragment 602 by modifying its coverage area to remove locations which fail stencil against the destination. The dynamic coverage antialiasing logic is then invoked using the modified coverage for the fragment 602. Updates to stencil in preserved fragments may be performed according to the relative occlusion of a fragment 602 against stored fragments 601.

While example embodiments of a graphics pipeline and rasterizer and various methods for rendering a pixel using the graphics pipeline and rasterizer have been described, the underlying concepts may be embodied in a variety of other stages within the graphics pipeline or other computing components other outside, for example, the GPU or display controller that may implement the graphics pipeline.

What is claimed:

1. A method for rendering a pixel upon an entry of graphical information into a pixel area, the method comprising:
receiving first graphical data of a first object in the pixel area;
determining first pixel coverage area,
wherein determining first pixel coverage area comprises:
maintaining one or more coverage points in the pixel area;
determining which coverage points maintained in the pixel area are covered by the first object; and
calculating first pixel coverage area based on the coverage points maintained in the pixel area that are covered by the first object;
providing the first graphical data based on the first pixel coverage area;
receiving second graphical data of a second object in the pixel area;
determining relative depth of the first and second objects in a projected view in a three dimensional graphical space;
determining second pixel coverage area,
wherein determining second pixel coverage area comprises:
determining which of the coverage points maintained in the pixel area are covered by the second object;
culling areas of the second pixel coverage area of the second object that fail depth tests against the first pixel coverage area of the first object and overlap with the first pixel coverage area of the first object; and
calculating second pixel coverage area from covered coverage points maintained in the pixel area;
providing the second graphical data based on the second pixel coverage area;
comparing the first and second pixel coverage areas; and
discarding either the first graphical data or second graphical data depending upon which of the first and the second graphical data has a least amount of non-occluded areas within their respective coverage areas,
wherein the first pixel coverage area and the second pixel coverage area each comprise at least some non-occluded area, wherein a collective depth of each of the first and the second graphical data is determined by calculating an average depth of each of a plurality of non-occluded coverage points within their respective coverage areas.

2. The method of claim 1 wherein first graphical data of the first object comprises two or more objects, each having associated graphical data.

3. The method of claim 1 wherein second graphical data of the second object comprises two or more objects, each having associated graphical data.

4. The method of claim 1 wherein a pixel shader executes upon a determination that graphical data is to be stored.

5. The method of claim 1 further comprising comparing the first and second objects based on stencil information, or alpha-to-coverage or translucency or any combination thereof.

6. The method of claim 1, wherein information associated with non-discarded graphical data is provided to a resolve process for obtaining data for display, and wherein data in neighboring pixels is provided to the resolve process when there are coverage points in the pixel area that do not have graphical data associated with them.

7. A system for rendering a pixel upon an entry of graphical information into a pixel area, wherein the system comprises a processor, wherein the processor executes computer executable instructions, and wherein the computer executable instructions comprise instructions for:
receiving first graphical data of a first object in the pixel area;
determining first pixel coverage area,
wherein determining first pixel coverage area comprises:
maintaining one or more coverage points in the pixel area;
determining which coverage points maintained in the pixel area are covered by the first object; and
calculating first pixel coverage area based on the coverage points maintained in the pixel area that are covered by the first object;
providing the first graphical data based on the first pixel coverage area;
receiving second graphical data of a second object in the pixel area;
determining relative depth of the first and second objects in a projected view in a three dimensional graphical space;
determining second pixel coverage area,
wherein determining second pixel coverage area comprises:

determining which of the coverage points maintained in the pixel area are covered by the second object;

culling areas of the second pixel coverage area of the second object that fail depth tests against the first pixel coverage area of the first object and overlap with the first pixel coverage area of the first object; and calculating second pixel coverage area from covered coverage points maintained in the pixel area;

providing the second graphical data based on the second pixel coverage area;

comparing the first and second pixel coverage areas; and discarding either the first graphical data or second graphical data depending upon which of the first and the second graphical data has a least amount of non-occluded areas within their respective coverage areas, wherein the first pixel coverage area and the second pixel coverage area each comprise at least some non-occluded area, wherein a collective depth of each of the first and the second graphical data is determined by calculating an average depth of each of a plurality of non-occluded coverage points within their respective coverage areas.

8. The system of claim 7 wherein first graphical data of the first object comprises two or more objects, each having associated graphical data.

9. The system of claim 7 wherein second graphical data of the second object comprises two or more objects, each having associated graphical data.

10. The system of claim 7 wherein a pixel shader executes upon a determination that graphical data is to be stored.

11. The system of claim 7 further comprising comparing the first and second objects based on stencil information, or alpha-to-coverage or translucency or any combination thereof.

12. The system of claim 7, wherein information associated with non-discarded graphical data is provided to a resolve process for obtaining data for display, and wherein data in neighboring pixels is provided to the resolve process when there are coverage points in the pixel area that do not have graphical data associated with them.

* * * * *